United States Patent [19]

Droullard et al.

[11] 4,185,199
[45] Jan. 22, 1980

[54] METHOD OF CONTINUOUSLY DETERMINING RADIATION WORKING LEVEL EXPOSURE

[75] Inventors: Robert F. Droullard; Robert F. Holub, both of Lakewood, Colo.

[73] Assignee: The United States of America as represented by the Secretary of the Interior, Washington, D.C.

[21] Appl. No.: 920,513

[22] Filed: Jun. 29, 1978

[51] Int. Cl.$^2$ .............................................. G01T 1/16
[52] U.S. Cl. .................................. 250/435; 250/364
[58] Field of Search ............... 250/253, 255, 304, 336, 250/364, 380, 252, 435, 432

[56] References Cited

U.S. PATENT DOCUMENTS

| | | | |
|---|---|---|---|
| 2,892,091 | 6/1959 | Sawle | 250/364 |
| 3,555,278 | 1/1971 | Schroeder | 250/435 |
| 3,968,371 | 7/1976 | Greendale | 250/435 |
| 3,988,587 | 10/1976 | Shreve et al. | 250/364 |
| 4,053,775 | 10/1977 | Franklin et al. | 250/435 |
| 4,055,762 | 10/1977 | Durkin | 250/364 |

*Primary Examiner*—Bruce C. Anderson
*Attorney, Agent, or Firm*—William S. Brown; Donald A. Gardiner

[57] ABSTRACT

A method for determining the working level exposure to airborne radioactive material by measuring the beta count per unit time. The gas radon-222 gives off three short lived daughter products commonly designated as RaA, RaB and RaC. Air, within the environment whose level is to be measured, is pumped through an opened face filter and screen assembly forming part of a detector holder mount. Radioactive particulate matter, consisting of radon-222 daughter products is collected on the filter. Thereafter, beta particles generated by the radioactive decay of the daughter products impinge upon a Geiger-Mueller tube which detects the beta particle activity per unit time. A pulse integrating system counts the detected beta particles. Based on prior experimentally calibrated results, the total count of beta particles is converted to a working level exposure.

6 Claims, 2 Drawing Figures mounted on a photo-etched support screen, and a constant air flow-controlled at one liter per minute for at least three hours.

The size of the filter used is largely governed by the annular end-window area of the detector. Present commercially available detectors and filters make the 2 inch filter the optimum compromise. The air flow rate must be constant but the actual value used can vary of a wide range. The back-up screen must be strong enough to support the filter while operating with negative air pressures up to 25 inches water gage, yet it must not impede air flow appreciably nor should it be thick enough to absorb the beta particles which must pass through it to reach the detector. For an aluminum back-up screen, the optimum thickness is about 0.006 inches. It should also be noted that the filter and back-up screen should be as close to the detector as physically practical to minimize air absorption of the lower energy beta particles. It is also essential that this distance be a constant value while using the detector system. Using the same equipment in a field experiment, it required continuous air flow for periods in excess of three hours to establish suitable conditions for the measurements. The voltage pulses outputted from the GM tube were counted and a correction factor was used to take into consideration the background radiation. Exposure level values in working hours was determined by means of a conversion factor previously experimentally arrived at.

The formula for working level (WL) exposure in hours reads as follows:

$$WLH = \left[ \frac{CPM \times K}{LPM} \right] T \tag{1}$$

Where:
WLH = Working level hours
CPM = Net counts per minute
K = Calibration factor for counts/minute and one liter/minute—a constant
LPM = Liters per minute of gas
T = Time in hours It is to be noted that our method is an inexact method since it does not measure all of the components needed to determine a working level. Therefore, inherent errors must be corrected for. It is useful to keep in mind certain facts when studying the graph of FIG. 2. For health purposes, which are our primary concern, there are four basic daughter products of the gas radon-222 present in the atmosphere of uranium mines. These daughter products are commonly designated as RaA, RaB, RaC, and RaC' being of the most concern because of the tissue damage caused by absorption of the highly energetic alpha particles emitted during the decay of these polonium isotopes. The half-lives for these four daughters would be 3.05 minutes for RaA, 19.7 minutes for RaC and RaC' and 26.8 minutes for RaB. Sequentially the decay process would be for RaA to decay to RaB with the emission of an alpha particle then RaB to RaC with the emission of a beta particles and gamma rays then RaC to RaC' with the emission of a beta particle and gamma rays, and lastly (for our purposes) RaC' to the unstable lead (Pb) 210 with the emission of an alpha particle. Since we measure only the beta particles—and hence the decay products of RaB and/or RaC—either one or two particles will be measured in the decay chain depending on their decay state at the time of capture on the filter.

FIG. 2 is a graph of the inherent error in the use of beta particle measurements for measuring working levels. The plus marks represent some 400 RaA, RaB, and RaC mixtures measured in uranium mines in the last 20 years by a number of investigators. The square marks represent more recent measurements made in the last 5 years. The graph is triangular in shape since any point within the triangle represents a mixture of the radon-222 daughters, that is, radium A (RaA), radium B (RaB), and radium C (RaC), that equals one working level of exposure ($1.3 \times 10^5$ MeV of alpha energy in one liter of air.) The detector of FIG. 1 is calibrated so that its shown zero inherent error line—the solid vertical line with a "O" label—passes through the bulk of this FIG. 2 field data. In this way the inherent error of the field measurements seldom exceeds +8%. Further, even this error can be reduced, if necessary, by adjusting the calibration factor for the dominant RaA, RaB, and RaC mixture in the particular environment of interest. This adjustment of calibration factor has the effect of shifting of the zero error line to either side. The calibration factors are determined by collecting grab samples of the mine air and measuring the working level values using either alpha spectroscopy or gross alpha counting methods to measure RaA, RaB and RaC.

Starting on page 5 of the referenced RI detailed background information relating to the FIG. 2 graph herein is given. What the graph depicts in picocuries is the distribution of mixture of RaA, RaB, and RaC found in underground mine or cave atmospheres and the inherent error for any nonexact—as here—method of measuring working levels. The measurements used to make the FIG. 2 graph were made at different times, by different people using different instruments. Although the methods used were different they consisted primary of the Thomas modified Tsivoglou method (J. W. Thomas, "Measurement of Radon Daughters in Air," Health Physics, volume 23, 1972, pages 783–789 cited in footnote 10 on page 14 of the RI) which is a gross alpha method that measures the activity of the three daughters RaA, RaB, and RaC exactly. As indicated in the previous paragraph the FIG. 2 triangular graph represents the airborne activity mixture of radon daughter products normalized to one working level. The lower left apex represents pure RaA (956.3 picocuries), the upper right apex pure RaB (193.9 picocuries), and the upper left apex pure RaC (263.7 picocuries). This latter apex also represents zero activity for RaA and RaB while zero activity for RaC lies on the hypotenuse side of the line drawn from the pure RaC (zero point of the RaA and RaB scale which is the same as the maximum or pure RaC) to the hypotenuse—shown as O on the hypotenuse. For simplicity purposes the RaC axis is not shown in FIG. 2. The zero solid line represents the zero inherent error line and the other solid lines (10%, 20%, . . . ) isoerror lines for the beta method of continuous working-level measurements.

Since our inexact method measures only the decay activity of RaB and/or RaC daughters of radon-222—they are the daughters which give off beta particles—the inherent error we know will occur is corrected for by determining the inherent error based on the exact readings of the FIG. 2 graph. The inherent error may be used to determine the value of the calibration factor K of formula (1). Although this is the pre-

METHOD OF CONTINUOUSLY DETERMINING RADIATION WORKING LEVEL EXPOSURE

BACKGROUND OF THE INVENTION

1. Field of the Invention

Our invention is a method of continuously measuring airborne mine radiation working level exposure.

2. Description of the Prior Art

Airborne mine radiation has previously been measured or determined by a variety of different methods. The three United States Patents bearing numbers 3,291,986 (Lamb), 3,409,771 (Riel), and 4,055,762 (Durkin) represent the closest known prior art. Of these three references only the Durkin patent is used to arrive at the same result as our invention which is to continuously determine working level exposure of uranium miners to the chain of short-lived daughter products of the gas radon-222. Above an established working level the alpha particles from some of these daughter products are believed to cause lung cancer when deposited in the respiratory system of miners. Like our invention, the Durkin patent determines exposure by forcing ambient air through a filter before it reaches a detector. However, unlike our detector the Durkin invention uses a solid state surface detector to directly measure the count of incident alpha particles from the daughters. In contrast we employ an open face filter and an indirect method of determining the alpha radiation by actually measuring the beta radiation incident on a detector and then, based thereon, calculating the exposure working level—any combination of daughter products (RaA, RaB, and RaC,) which produce $1.3 \times 10^5$ million electron volts (MeV) of alpha energy is one liter of air. This indirect method reduces or eliminates significant errors caused by plate out of the particulates when they are drawn through small orifices necessary when making radioactivity measurements on the collection side of the filter. The final step of our method is to evaluate the inherent error from the beta particle emitting method and provide an optimized error map.

The reference mentioned to Lamb teaches the use of a counter for airborne beryllium with an alpha source filter that reacts with the beryllium particles to produce carbon—12 atoms, gamma rays and neutrons. Radiation detectors detect gamma photons and/or neutrons and convert them into electrical pulses. The rate of these pulses corresponds to the amount of beryllium present in the air. In the Riel patent, a solution containing the radioactive isotope is pumped through a filter which has a radioactive isotope extracting resin. A detector and spectrometer than detects and counts the radioactive isotopes on the filter.

In addition to the foregoing prior art references U.S. Pat. No. 3,056,886 (Glaude et al) disclose a method wherein radon is absorbed by an activated carbon and then counting the beta particles emitted by radium C in the carbon.

The United States Bureau of Mines Report of Investigations (RI) 8237 published August 1977 entitled "Continuous Working Level Measurements Using Alpha or Beta Detectors" authored by us contains more details and background information relating to this invention and is specifically incorporated herein by reference.

Although much of the structure to perform the preferred embodiment of our invention shares a degree of common elements with the mentioned and known prior art, none describes or discloses the method set forth herein. In particular, none of the known prior art discloses a method for continuously measuring and determining the working level exposure to airborne daughters of the gas radon-222 in which the alpha energy concentration is determined by measuring the beta count and then correcting for errors in the same.

SUMMARY

Our invention is a method for continuously measuring and determining the exposure level in a mine or other underground opening of airborne radioactive material. To accomplish the desired objective the ambient mine air is forced into a filter-detector holder. Initially the air impinges an opened face filter which removes particulate matter including radon-222 daughter products. The radioactive decay of the radon-222 daughters results in beta particles being emitted which penetrate the filter paper and the back-up screen to enter the detector where they are changed into representative electric signal pulses and counted. The counted pulses are then corrected for and related to the working level exposure. Using calibration techniques, errors in the total count of pulses can be corrected for in the final results by adjusting the results against previously known zero level results.

The primary objective of this invention is an improved method of determining the working level exposure of airborne radioactive material resulting from the radioactive decay of radon-222.

BRIEF DESCRIPTION OF THE DRAWINGS

FIG. 1 schematically shows how a filter/detector assembly would work to accomplish the objectives of our invention. Ambient air containing the airborne radioactive daughter products of the gas radon-222 enter the open faced filter 1. By the term opened face filter we refer to a filter directly exposed to the ambient gas without any guard or additional housing, etc., therebetween. The flat planar annular filter with its supporting aluminum backup annular screen 3 is held within an annular recess 5 of the detector holder housing by an outwardly threaded retaining ring 7. The ring's threads 9 engage complementary threads within the recess. Air entering the housing first encounters the filter paper. Due to the action of the illustrated constant vacuum source 11 (pump) the air is drawn through the filter and its support screen at a controlled constant flow rate to an exhaust port 13 resulting in the collection of particulates on the filter's outer surface. This deposited particulate matter includes dirt and other solid materials as well as radon daughter product particles. The more penetrating beta particles—as well as gamma rays—go through the filter paper and its back up support screen. Thereafter traveling at about ten percent of the velocity of light they impinge the Geiger-Mueller (GM) detector tube or similar detector which detects beta particles and outputs representatives voltage signal pulses for them.

Figure 1:
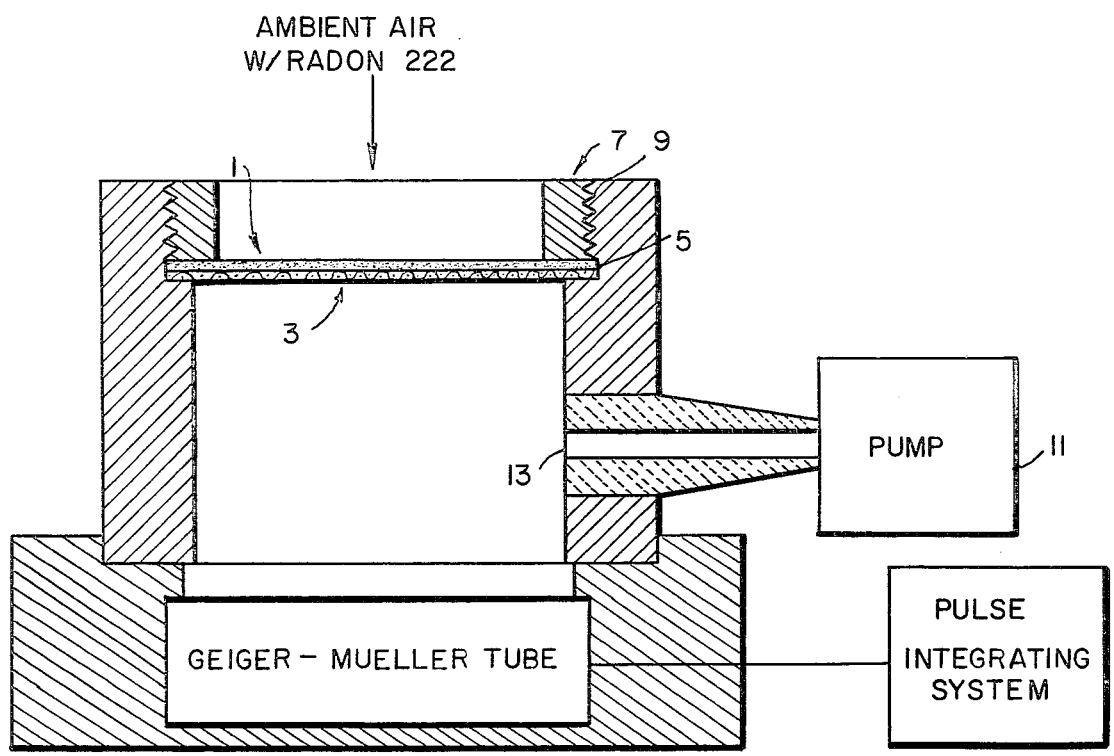
FIG. 1 schematically shows how the preferred embodiment of the invention would work.
Figure 2:
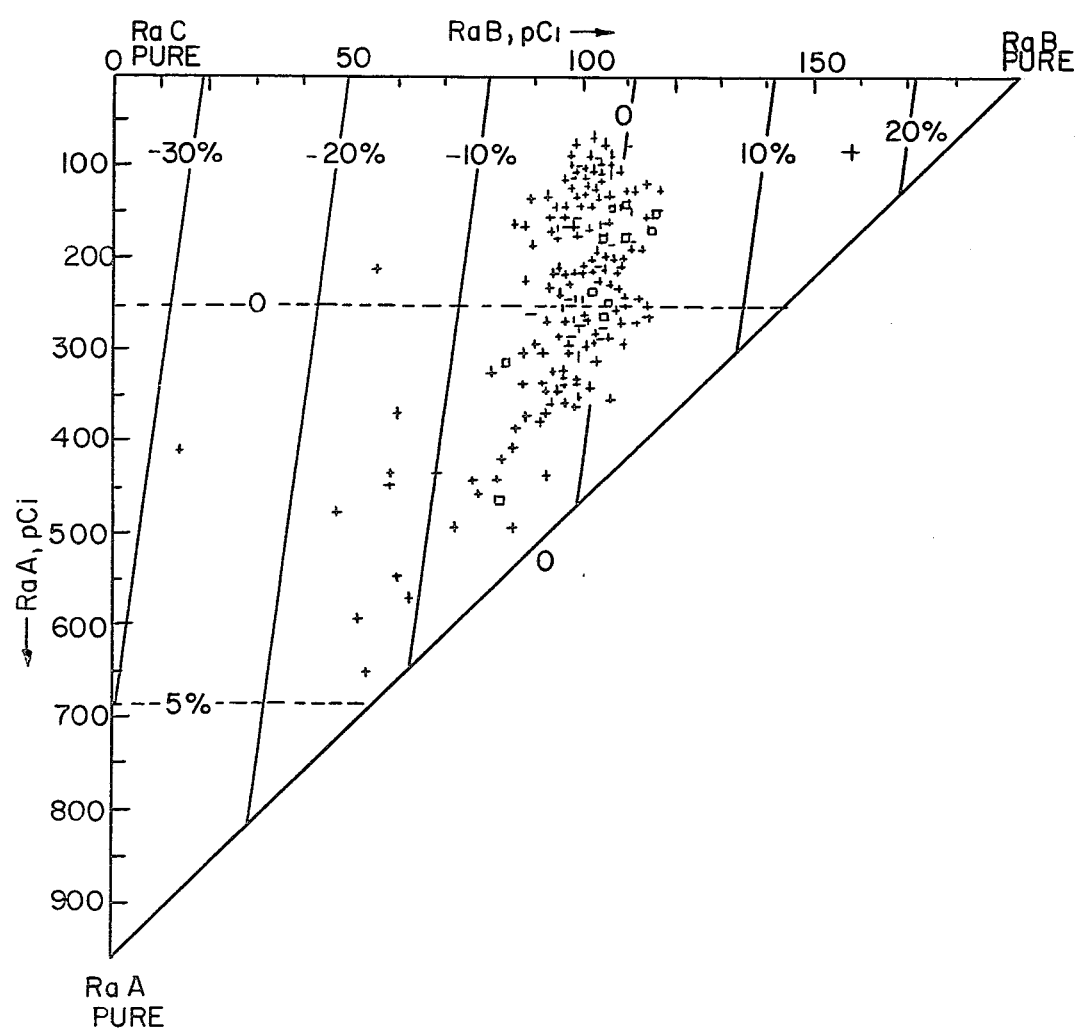
FIG. 2 is a graph of measurements for RaA, RaB, and RaC mixtures measured in a uranium mine normalized to one working level.

One embodiment utilized a pancake type GM tube with a 9 milligram/cm$^2$ areal window which was spaced 0.75 inches from the back-up screen, operated by a 900 volts D.C., a forty-seven millimeter fiber glass filter ferred way it is also possible to calibrate the on site measurements by comparison with the data of FIG. 2.

Certain features of our invention should be emphasized. Using an opened face filter, as constrasted against other detectors protective housing and with small orifices, reduce or eliminate significant errors caused by plate-out of the particulates when the radioactivity measurements are made on the collection side of the filter. Therefore, the turbulence problems commonly associated with collection side measurements are greatly reduced to a very low or neglible level (not exceeding 1 or 2%). By calculating and correcting for the inherent error associated with measuring beta particles worthwhile data is obtained for determining the working level value for various mixtures of the three short lived Radon daughters RaA, RaB, and RaC of radon-222. These important features of our invention provide a valuable tool to allow the continuous determining of the working level exposure measurements of uranium miners.

Other variations from the preferred embodiment are possible. None should be used to vary the scope and extent of our invention which is to be measured only by the claims which follow.

We claim:

1. An indirect method for continuously determining the working level exposure of an individual to airborne alpha radioactivity from the daughter products of radon -222 gas by only counting the beta particles comprising the steps of:
   (1) forcing the ambient gas towards and through an open face filter contained within a filter detector assembly to filter out particulate matter including alpha radon -222 daughter products;
   (2) after filtering, using the detector of the filter detector assembly for detecting the number of beta particles emitted from and through the filter;
   (3) electronically counting the detected beta particles;
   (4) correcting for any inherent error obtained in the count of beta particles; and
   (5) converting the corrected count to working level exposure of alpha particles.

2. The method of claim 1 wherein step (1) is performed at a substantially constant flow rate and the correcting step (4) is provided for by determining the inherent error zero level of an exact method graph of the three radon-222 daughters RaA, RaB, and RaC.

3. The method of claim 1 wherein step (2) is accomplished by using a Geiger-Mueller tube which detects both beta particles and gamma rays from the filtered daughter products.

4. The method of claim 1 wherein step (1) is performed at a continuous gas flow rate for a period of at least three hours before the beta particles are counted in step (3).

5. The method of claim 2 wherein the counted particles of step (3) are converted to working level exposure in step (5) according to the relationship:

$$WLH = \left[ \frac{CPM \times K}{LPM} \right] T \qquad (1)$$

where
   WLH is the working level hours, CPM the net beta counts per minutes, K a constant value calibration factor, LPM the liters of gas flowing through the filter per minute, and T the time in hours.

6. The method of claim 5 wherein step (4) takes place before step (5) with the calibration factor K of step (5) being determined by step (4).